United States Patent [19]
Koops et al.

[11] Patent Number: 6,075,915
[45] Date of Patent: Jun. 13, 2000

[54] IN-FIBER PHOTONIC CRYSTALS AND SYSTEMS

[76] Inventors: Hans W. P. Koops, Ernst Ludwig Strasse 16, 64372 Ober-Ramstadt, Germany; Gerald Meltz, 77 Daventry Hill Rd., Avon, Conn. 06001

[21] Appl. No.: 09/048,508

[22] Filed: Mar. 26, 1998

[30] Foreign Application Priority Data

Mar. 29, 1997 [DE] Germany ............................ 197 13 371

[51] Int. Cl.[7] ........................................................ G02B 6/20
[52] U.S. Cl. ............................................ 385/125; 385/123
[58] Field of Search ................................... 385/123–128, 385/122, 129–133; 359/332

[56] References Cited

U.S. PATENT DOCUMENTS 5,802,236   9/1998   DiGiovanni et al. ................... 385/127

OTHER PUBLICATIONS

Birks et al., "Full 2–D photonic bandgaps in silica/air structures", Electonic Letters, Oct. 26, 1995, vol. 31, No. 22, p. 1941, Oct. 1995.

*Primary Examiner*—John D. Lee
*Assistant Examiner*—Michelle R. Connelly-Cushwa
*Attorney, Agent, or Firm*—M. P. Williams

[57] ABSTRACT

One or more photonic crystals 11, 22, 40, 58, 59 are formed directly in the path of light within an optical fiber 13, 23, 42, 56. Light processed by the photonic crystal may be transmitted out of the fiber by means of a lens 48 or it may be measured by a photoresistive device 51, 60. The photonic crystal may be formed in a trench 12 as an array of dielectric rods 16 having one or more selective defects 17, or the crystal may be formed by providing holes 20 directly in the optical fiber. Filling the interstices between rods 16 with non-linear optical material, and subjecting the crystal to a varying electric field applied by electrodes or to a varying optical radiation can produce a tunable photonic crystal within an optical fiber.

15 Claims, 3 Drawing Sheets

IN-FIBER PHOTONIC CRYSTALS AND SYSTEMS

TECHNICAL FIELD

This invention relates to optical processing systems formed directly in and on optical fibers, including photonic crystals formed directly within the light path in an optical fiber.

BACKGROUND ART

Photonic crystals are known to provide wavelength-dependent filters, beam splitters, mirror components, and right-angle waveguides. For example, reference may be had to A. Mekis, et al, "High Transmission Through Sharp Bends in Photonic Crystal Waveguides", Physical Review Letters, V. 77, N. 18, Oct. 28, 1996, pp. 3787–3790, and to H. W. P. Koops, "Photonic Crystals Built by 3-Dimensional Additive Lithography Enable Integrated Optics of High Density", in Photorefractive Fiber and Crystal Devices: Materials, Optical Properties, and applications II, (F.T.S. Yu, S. Yen, Editors) Proceedings Society Photographic and Instrumentation Engineering, Volume 2849, August, 1966, pp. 248–256. Because photonic crystals are on the order of several wavelengths in each of two major dimensions, and are made with microprocessing techniques, optical processing systems employing photonic crystals can be extremely small, thereby permitting extremely high bit density and high rates of processing data.

A principal drawback, as is pointed out by Koops, supra, is the formidable problem of coupling light between waveguides and photonic crystals.

DISCLOSURE OF INVENTION

Objects of the invention include coupling light directly between optical waveguides and photonic crystals, provision of optical signal processors which manipulate optical signals with a minimum of losses, optical signal processing implemented with minimal adjunctive devices, and integrated microminiature optical signal processing systems.

According to the present invention, a photonic crystal is formed directly in the light path within an optical fiber, whereby light is directly coupled between the optical waveguide formed by the fiber and the optical signal processor formed by the photonic crystal. In accordance with one form of the invention, a slot or trench is formed from one peripheral edge of an optical fiber through a significant fraction of the fiber, including and beyond the core of the fiber, and the optical crystal is formed in that space, thereby being directly in the path of the light as is traverses the optical fiber. In the first embodiment, the photonic crystal may preferably be formed by dielectric rods produced, for instance, by three dimensional additive lithography, in a defined geometric pattern which determines the characteristics, wavelength and band width of the resulting photonic crystal device. According to the invention in another form, a photonic crystal is formed directly in an optical fiber by drilling substantially cylindrical columnar holes in a photonic crystal pattern, dependent upon the effect and wavelengths desired, directly into the optical fiber, from one peripheral edge, through a significant fraction of the fiber including and beyond the core of the fiber.

In accordance with the invention, the interstices between the dielectric rods formed in a trench within an optical fiber contain a non-linear optical material, which has an electrically controllable or optically controllable dielectric constant, to provide wavelength-controllable photonic crystals, such as for use as a selectively operable switch.

According to the invention further, photonic crystals may be formed within an optical fiber along with other photonic crystals, or other optical or electrooptical devices, so as to provide microoptical systems directly in the fiber. In further accord with the invention, a photonic crystal formed directly within an optical fiber may be associated with a photoelectric element, such as a photoresistive layer, so as to derive electrical signal outputs from the optical processing system within the fiber. On-fiber lenses may be used to transmit light to and from an in-fiber photonic crystal.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
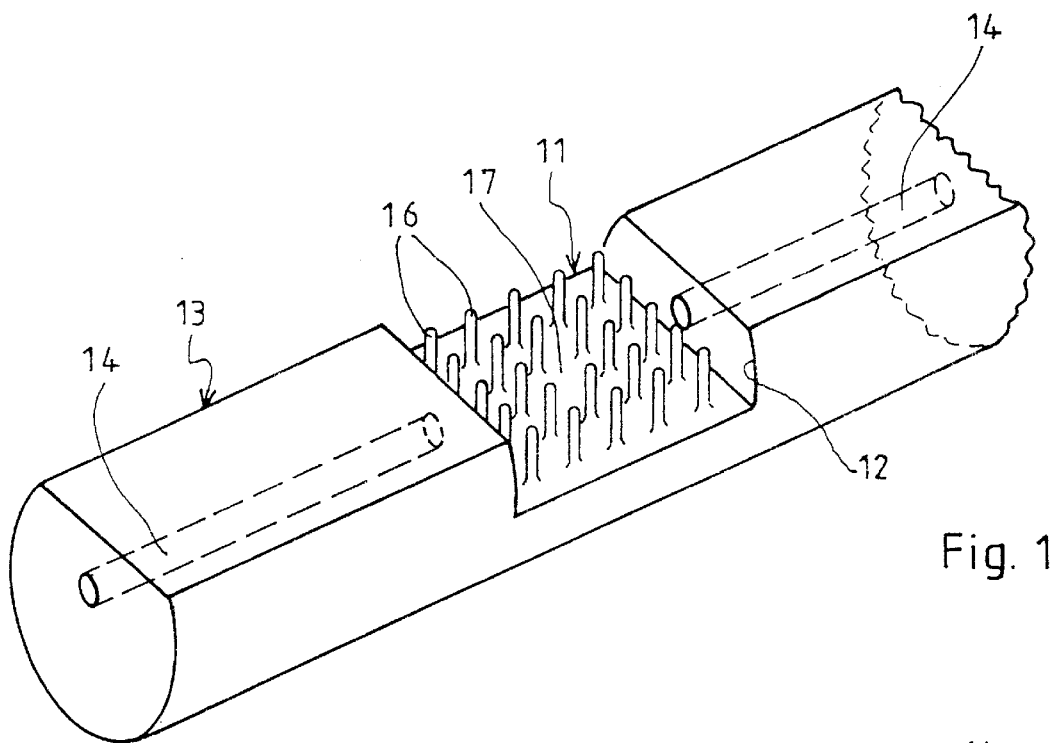
FIG. 1 is a perspective view of a narrow band filter in a trench cut into a D-profile optical fiber, the photonic crystal comprises dielectric rods formed by three dimensional additive lithography.

Referring now to FIG. 1, a photonic crystal 11 is formed within a trench 12 of an optical fiber 13 having a core 14. The photonic crystal 11 comprises a plurality of dielectric rods 16 arranged, in this case, in an orthogonal matrix with a defect, in this case the absence of a dielectric rod, in the center 17 of the array. The photonic crystal 11 in the configuration shown, comprises a narrow band filter. In the general case, the interstices between the dielectric rod 16 may be backfilled with amorphous or microcrystalline polymer, if desired, for strength; but the invention may be practiced without backfilling, if desired. The trench 12 may extend along the length of the fiber 13 for a few microns. The trench may be formed in the fiber by means of lithography, dry or wet etching, or by laser or ion ablation.

In FIG. 1, the optical fiber 13 is a D-profile fiber in which the light is transmitted through the monomode core 14, close to the flat surface; the initial D-profile of the fiber allows simple removal of material to form an adequate trench.

Figure 2:
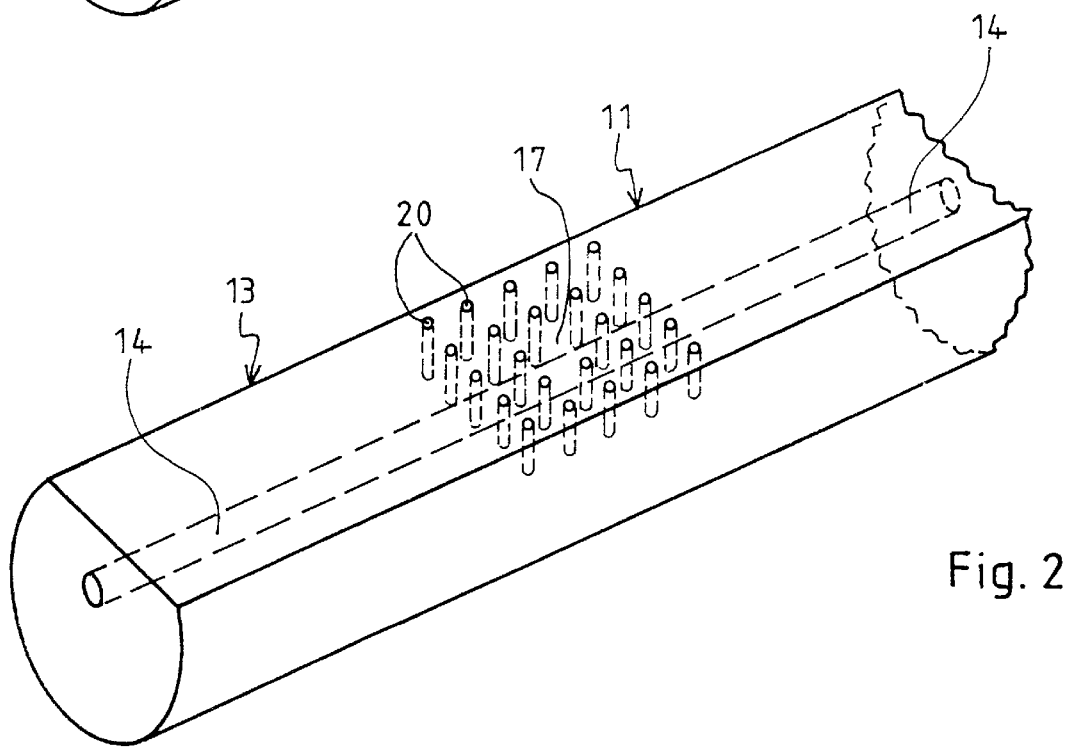
FIG. 2 is a perspective view of a narrow band filter in which the photonic crystal is formed by creating substantially cylindrical holes directly in the optical fiber.

Referring to FIG. 2, another embodiment of the invention forms a photonic crystal 11 directly in the optical fiber 13 simply by drilling a plurality of substantially cylindrical holes 20 in the optical fiber material, in a defined geometric pattern. The photonic crystal 11 in FIG. 2 is a narrow band filter (similar to that of FIG. 1) the defect being the absence of a hole at the center 17 of the matrix. Thus, the invention is placing a photonic crystal directly in an optical fiber, and the manner of so doing is irrelevant to the invention.

Figures 3, 4:
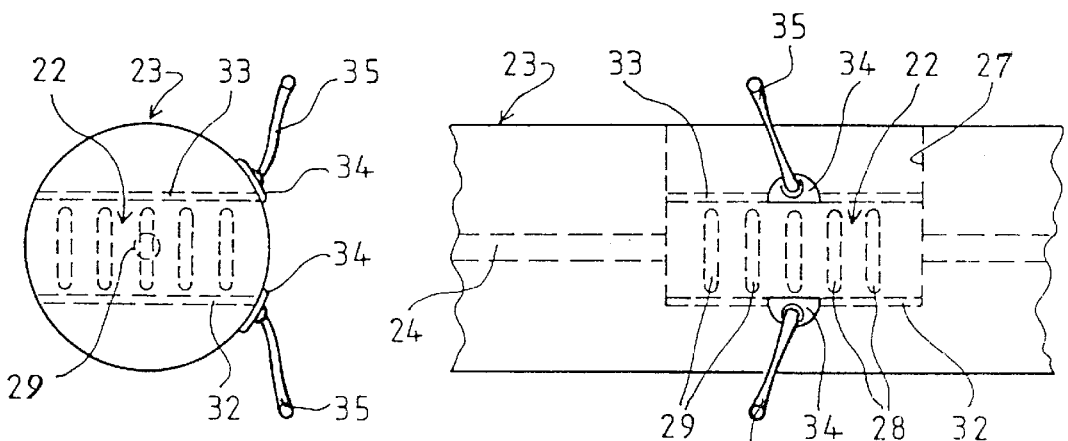
FIG. 3 is an end elevation view of a round optical fiber having an electrically variable photonic crystal disposed therein.
FIG. 4 is a side elevation view of the optical fiber and photonic crystal of FIG. 3.

Referring to FIGS. 3 and 4, the photonic crystal 22 is formed in a round optical fiber 23, having a core 24. The photonic crystal 22 may be formed in a trench 27 (as in FIG. 1) the interstices 28 between the dielectric rods 29 being partly or completely filled with non-linear optical material. Prior to formation of the photonic crystal 22, an electrical layer 32 is provided in the bottom of the trench 27, substantially throughout the extent that the photonic crystal 22 will occupy. After filling with non-linear optical material, another electrical layer 33 is formed. The layers 32 and 33 terminate externally in pads 34 to which electrical leads 35 may be wire bonded. By varying the electric field between the conductive layers 32, 33 the optical properties, particularly the refractive indexes, of the various parts of the photonic crystal 22 will be altered, thereby altering the characteristic or the critical wavelengths of the device, as set forth in German patent application Serial No. 195 42 058.6, filed Nov. 10, 1995. FIGS. 3 and 4 also illustrate that the present invention, forming photonic crystals directly in optical fibers, may be practiced in round optical fibers as well as in D-profile optical fibers.

Instead of using electrodes and a varying voltage in order to tune the non-linear optical material, the non-linear optical material may be flooded with light, either from an external source utilizing lenses as in our prior copending application, or by illumination parallel with and exterior of the core of the optic fiber, similar to that in optically pumped fiber lasers, in a well known way.

Figures 5, 6:
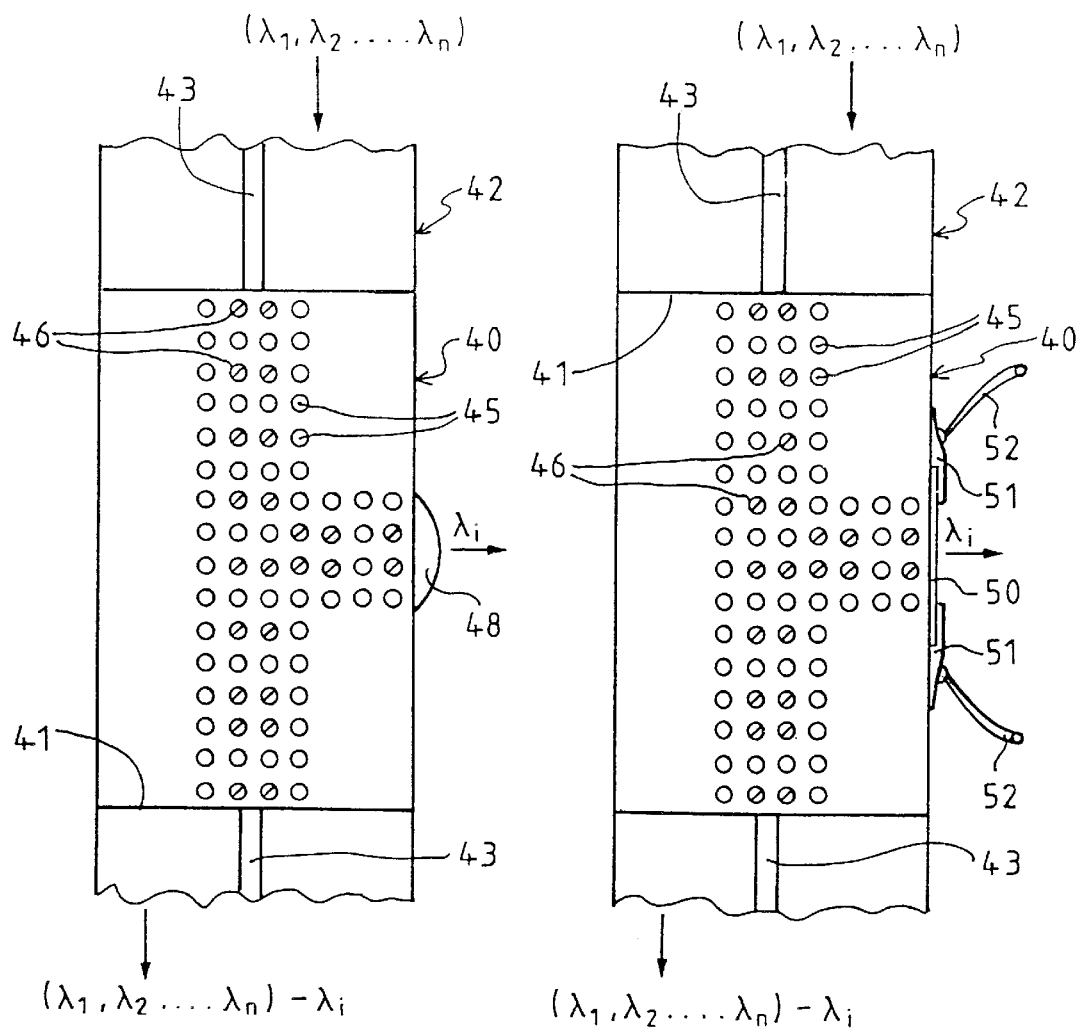
FIG. 5 is a top plan view of a photonic crystal in an optical fiber having a lens formed on the periphery thereof.
FIG. 6 is a top plan view of a photonic crystal in an optical fiber having a photoelectric layer disposed on the periphery thereof.

Referring to FIG. 5, a photonic crystal 40 is formed within a trench 41 of an optical fiber 42 which has a core 43. The photonic crystal 40 comprises columns of refractive index difference 45 which may comprise either dielectric rods (16 in FIG. 1) or holes (20, FIG. 2), represented in FIG. 5 as empty circles. The defects are indicated in FIG. 5 as circles 46 with lines through them. The pattern of FIG. 5 is not intended to represent any particular function, but merely be illustrative of photonic crystals in general. However, such a pattern can be presented that will provide a drop function (or, since the optics are reversible, an add function) in which light at a particular frequency λi is allowed to be steered through a right angle to pass through a lens 48 formed directly on the side of the optical fiber 42, utilizing the dry-resist method disclosed in German patent application 195 31 860.9, filed Aug. 30, 1995, or utilizing principles of our copending German application 197, 13 374.6, filed on Mar. 29, 1997, or its U.S. counterpart Ser. No. 08/993,066, filed Dec. 18, 1997 (now U.S. Pat. No. 5,982,962). Selected light passing out of (or into) the photonic crystal 40 through the lens 48 will be fed through a similar lens on the side of another optical fiber into such other optical fiber, or it may be focused on the end of an optical fiber, or the like. The manner of utilizing light processed by a photonic crystal is irrelevant to the invention; the invention being the placement of the photonic crystal directly in an optical fiber.

Referring to FIG. 6, another method for utilizing light processed by a photonic crystal includes a photoresistive layer 50, formed at the edge of the optical fiber 42, electrically in contact with pads 51 to which electrical leads 52 may be wire bonded. Thus, electrical signals indicative of the intensity of the wavelength extracted by the photonic crystal 40 are provided by the photoresistive layer 50, as disclosed in German patent application Serial No. 196 21 175.1, filed May 24, 1996.

Figure 7:
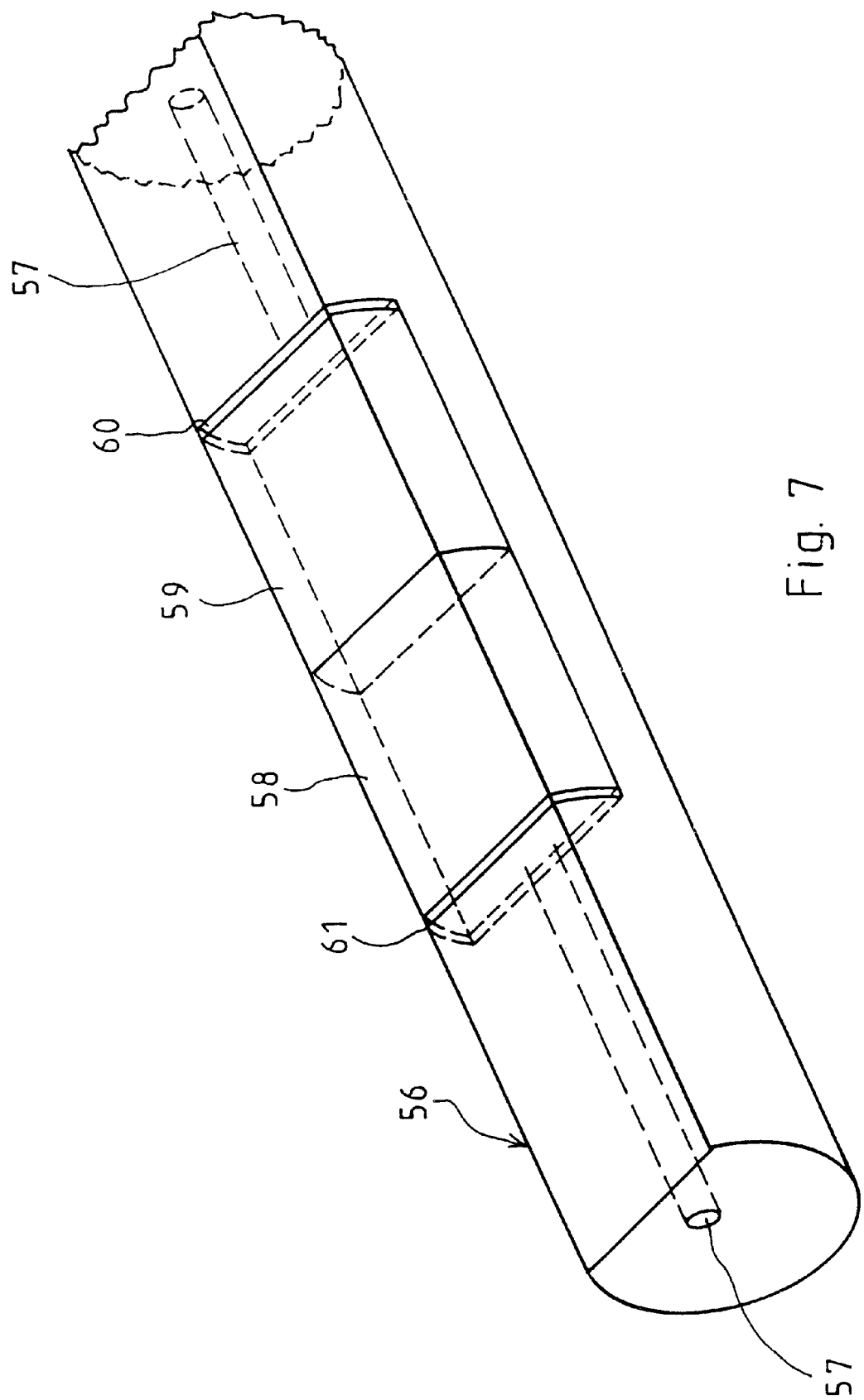
FIG. 7 is a perspective view of an optical fiber having a plurality of photonic crystals and other elements, such as a photoelectric layer and an index matching film, formed therein.

Referring to FIG. 7, a D-profile optical fiber 56 having a core 57 therein is provided with a plurality of photonic crystals 58, 59 as well as a photoresistive layer 60 directly in the path of light, within the optical fiber 56. In this case, the photoresistive layer 60 will measure the magnitude of light that remains in the fiber. The electrical leads for the layer 60 are omitted in FIG. 7 for clarity. More importantly, an additional coating or layer 61 of photonic rod material, such as a suitable, properly doped polymer, may provide special attenuating or moderating functions, particularly index matching to reduce reflections at a fiber/crystal interface. Such layers may also be behind the crystal (where the layer 60 is shown) or between crystals. The present invention, forming the photonic crystals either singly, or in combination with other photonic crystals or optical or opto-electric elements or layers directly within an optical fiber, can be combined in very complex ways by provision of such optical devices in two or more optical fibers, selectively coupling light therebetween and in some instances recombining the light after separate processing. For instance, optical metrology devices may be formed of multiple photonic crystals and non-linear optical devices as well as photo-resistors to measure various characteristics of the light in the fiber, such as polarization, amplitude and pulse sequence, etc. Stated another way, the invention provides the means, photonic crystals within fiber optics, to produce very complex optical systems in a microminiaturized form.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A photonic crystal formed directly in the path of light within an optical fiber having a longitudinal axis, said photonic crystal formed of elements of differing refractive index, normal to said axis.

2. A photonic crystal according to claim 1 wherein said photonic crystal comprises a plurality of dielectric rods formed in a trench within said optical fiber.

3. A photonic crystal according to claim 2 wherein the interstices between said dielectric rods is filled with amorphous polymer material for support.

4. A photonic crystal according to claim 2 wherein the interstices between said dielectric rods contain a non-linear optical material.

5. A photonic crystal according to claim 4 further comprising a pair of electrodes disposed near opposite ends of said dielectric rods, for applying an electric field to said non-linear optical material, thereby to vary the characteristics of said photonic crystal.

6. The photonic crystal according to claim 4 wherein the characteristics of said photonic crystal are modified by selective illumination of said non-linear optical material with light.

7. The photonic crystal according to claim 1 wherein said photonic crystal is formed by providing holes in a desired pattern which includes the path of light in said optical fiber.

8. A photonic crystal according to claim 1 including a photoresistive layer for sensing the magnitude of light passing through a portion of said photonic crystal.

9. A photonic crystal according to claim 8 wherein said photoresistive layer is formed on a surface of said optical fiber to measure the magnitude of light passing between said surface and a portion of said photonic crystal.

10. A photonic crystal according to claim 8 wherein said photoresistive layer is formed directly within the path of light within said optical fiber.

11. A photonic crystal according to claim 1 wherein said optical fiber includes a second photonic crystal formed in said optical fiber adjacent to said first named photonic crystal.

12. A photonic crystal according to claim 1 including a lens for focusing light passing between the surface of said optical fiber and a portion of said photonic crystal.

13. A photonic crystal according to claim 1 including a layer of photonic rod material at an interface between said crystal and said fiber in said path of light.

14. A photonic crystal according to claim 1 wherein said optical fiber is a D-profile fiber.

15. A photonic crystal according to claim 1 wherein said optical fiber is a round profile fiber.

* * * * *